(12) United States Patent
Tu et al.

(10) Patent No.: US 12,413,694 B2
(45) Date of Patent: Sep. 9, 2025

(54) METHOD AND DEVICE FOR ADJUSTING DEPTH OF STEREOSCOPIC IMAGE

(71) Applicant: Acer Incorporated, New Taipei (TW)

(72) Inventors: Tsung-Wei Tu, New Taipei (TW); Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 239 days.

(21) Appl. No.: 18/363,716

(22) Filed: Aug. 1, 2023

(65) Prior Publication Data

US 2024/0223740 A1    Jul. 4, 2024

(30) Foreign Application Priority Data

Dec. 28, 2022    (TW) .................................. 111150471

(51) Int. Cl.
*H04N 13/128*    (2018.01)
*H04N 13/368*    (2018.01)
*H04N 13/371*    (2018.01)
*H04N 13/398*    (2018.01)

(52) U.S. Cl.
CPC ......... *H04N 13/128* (2018.05); *H04N 13/368* (2018.05); *H04N 13/371* (2018.05); *H04N 13/398* (2018.05)

(58) Field of Classification Search
CPC .. H04N 13/128; H04N 13/368; H04N 13/371; H04N 13/398
See application file for complete search history.

(56) References Cited

U.S. PATENT DOCUMENTS

| 5,065,236 | A | * | 11/1991 | Diner | G02B 30/22 |
| | | | | | 348/42 |
| 5,825,456 | A | * | 10/1998 | Tabata | H04N 13/383 |
| | | | | | 348/51 |
| 5,936,663 | A | * | 8/1999 | Tabata | H04N 13/111 |
| | | | | | 348/E13.067 |
| 6,798,406 | B1 | * | 9/2004 | Jones | H04N 13/296 |
| | | | | | 348/42 |
| 9,445,072 | B2 | * | 9/2016 | Stefanoski | H04N 13/122 |

(Continued)

FOREIGN PATENT DOCUMENTS

| CN | 104781873 | 7/2015 |
| CN | 113315962 | 8/2021 |

(Continued)

*Primary Examiner* — Charles L Beard
(74) *Attorney, Agent, or Firm* — JCIPRNET

(57) ABSTRACT

A method for adjusting a depth of a stereoscopic image includes the following. A first disparity correction amount is obtained according to a distance between centers of two lenses of a stereoscopic camera and an interpupillary distance (IPD) of a first observer. A second disparity correction amount is obtained according to a difference between image distances of a stereoscopic display and the stereoscopic camera at zero disparity. A third disparity correction amount is obtained according to the IPD of the first observer and an IPD of a second observer. A stereoscopic image of an object photographed by the stereoscopic camera which has been corrected by the first disparity correction amount, the second disparity correction amount, and the third disparity correction amount is transmitted to the stereoscopic display. A device for adjusting a depth of a stereoscopic image is also provided.

18 Claims, 11 Drawing Sheets

(56) References Cited

U.S. PATENT DOCUMENTS

| | | | | |
|---|---|---|---|---|
| 9,549,167 B2* | 1/2017 | Ushiki | | H04N 13/178 |
| 9,612,657 B2* | 4/2017 | Bertram | | H04N 13/156 |
| 9,641,826 B1* | 5/2017 | Carlson | | H04N 13/275 |
| 10,595,001 B2* | 3/2020 | Kim | | H04N 13/122 |
| 10,616,567 B1* | 4/2020 | Clemens | | G06T 15/20 |
| 10,656,596 B2* | 5/2020 | Callagy | | G03H 1/0005 |
| 10,855,965 B1* | 12/2020 | Jiao | | H04N 13/383 |
| 10,922,870 B2* | 2/2021 | Vaganov | | G06T 15/02 |
| 2004/0233275 A1* | 11/2004 | Tomita | | G02B 30/25 |
| | | | | 348/42 |
| 2004/0252374 A1* | 12/2004 | Saishu | | H04N 13/305 |
| | | | | 359/462 |
| 2005/0001833 A1* | 1/2005 | Kim | | H04N 13/275 |
| | | | | 348/E13.058 |
| 2005/0089212 A1* | 4/2005 | Mashitani | | H04N 13/366 |
| | | | | 348/E13.059 |
| 2005/0190258 A1* | 9/2005 | Siegel | | H04N 13/111 |
| | | | | 348/42 |
| 2005/0271303 A1* | 12/2005 | Simpson | | G02B 30/34 |
| | | | | 348/E13.067 |
| 2007/0188667 A1* | 8/2007 | Schwerdtner | | H04N 13/305 |
| | | | | 348/E13.05 |
| 2008/0049100 A1* | 2/2008 | Lipton | | H04N 13/144 |
| | | | | 348/43 |
| 2008/0246757 A1* | 10/2008 | Ito | | G06T 15/10 |
| | | | | 348/E13.008 |
| 2009/0219283 A1* | 9/2009 | Hendrickson | | H04N 13/128 |
| | | | | 345/473 |
| 2009/0295790 A1* | 12/2009 | Pockett | | H04N 13/239 |
| | | | | 345/419 |
| 2010/0039502 A1* | 2/2010 | Robinson | | H04N 13/246 |
| | | | | 348/47 |
| 2010/0142801 A1* | 6/2010 | Koppal | | H04N 13/10 |
| | | | | 382/154 |
| 2010/0142924 A1* | 6/2010 | Yamashita | | G11B 27/10 |
| | | | | 348/42 |
| 2010/0220178 A1* | 9/2010 | Takahashi | | H04N 13/10 |
| | | | | 348/54 |
| 2010/0253680 A1* | 10/2010 | Kobayashi | | H04N 13/189 |
| | | | | 345/419 |
| 2010/0272417 A1* | 10/2010 | Nagasawa | | H04N 13/183 |
| | | | | 386/239 |
| 2010/0309296 A1* | 12/2010 | Harrold | | H04N 13/317 |
| | | | | 348/54 |
| 2010/0328533 A1* | 12/2010 | Mitani | | H04N 13/356 |
| | | | | 348/521 |
| 2011/0012995 A1* | 1/2011 | Watanabe | | H04N 13/239 |
| | | | | 348/51 |
| 2011/0050864 A1* | 3/2011 | Bond | | H04N 13/261 |
| | | | | 348/42 |
| 2011/0063421 A1* | 3/2011 | Kubota | | H04N 13/10 |
| | | | | 348/E13.001 |
| 2011/0090215 A1* | 4/2011 | Ohta | | H04N 13/275 |
| | | | | 345/419 |
| 2011/0157313 A1* | 6/2011 | Chiang | | H04N 21/4782 |
| | | | | 348/51 |
| 2011/0161843 A1* | 6/2011 | Bennett | | H04N 21/235 |
| | | | | 715/760 |
| 2011/0175907 A1* | 7/2011 | Tokuda | | H04N 13/128 |
| | | | | 345/419 |
| 2011/0181593 A1* | 7/2011 | Hirai | | H04N 13/128 |
| | | | | 382/190 |
| 2011/0211815 A1* | 9/2011 | Yamashita | | H04N 13/128 |
| | | | | 386/E5.028 |
| 2011/0229012 A1* | 9/2011 | Singhal | | H04N 13/111 |
| | | | | 382/154 |
| 2011/0242286 A1* | 10/2011 | Pace | | H04N 13/133 |
| | | | | 348/47 |
| 2011/0242296 A1* | 10/2011 | Ishihara | | H04N 13/183 |
| | | | | 348/54 |
| 2011/0292183 A1* | 12/2011 | Tajiri | | H04N 13/189 |
| | | | | 348/E13.074 |
| 2011/0305443 A1* | 12/2011 | Sasaki | | H04N 13/183 |
| | | | | 386/E5.028 |
| 2012/0002014 A1* | 1/2012 | Walsh | | G06T 19/006 |
| | | | | 348/47 |
| 2012/0038745 A1* | 2/2012 | Yu | | H04N 13/183 |
| | | | | 348/46 |
| 2012/0062556 A1* | 3/2012 | Yamamoto | | H04N 13/366 |
| | | | | 345/419 |
| 2012/0086711 A1* | 4/2012 | Lee | | H04N 13/183 |
| | | | | 345/419 |
| 2012/0086714 A1* | 4/2012 | Yeon | | H04N 13/361 |
| | | | | 345/419 |
| 2012/0139906 A1* | 6/2012 | Zhang | | G06T 19/006 |
| | | | | 345/419 |
| 2012/0146894 A1* | 6/2012 | Yang | | H04N 13/279 |
| | | | | 345/156 |
| 2012/0169730 A1* | 7/2012 | Inoue | | H04N 13/128 |
| | | | | 345/419 |
| 2012/0182406 A1* | 7/2012 | Woo | | H04N 13/398 |
| | | | | 359/464 |
| 2012/0229628 A1* | 9/2012 | Ishiyama | | H04N 13/239 |
| | | | | 348/135 |
| 2012/0236002 A1* | 9/2012 | Bi | | G06T 15/30 |
| | | | | 345/427 |
| 2012/0249532 A1* | 10/2012 | Kawada | | H04N 13/144 |
| | | | | 345/419 |
| 2012/0256912 A1* | 10/2012 | Yamaguchi | | H04N 13/128 |
| | | | | 345/419 |
| 2012/0274629 A1* | 11/2012 | Baek | | H04N 13/128 |
| | | | | 345/419 |
| 2012/0306860 A1* | 12/2012 | Hatta | | H04N 13/366 |
| | | | | 345/419 |
| 2012/0307023 A1* | 12/2012 | Freiburg | | H04N 13/128 |
| | | | | 348/51 |
| 2012/0320047 A1* | 12/2012 | Yanagita | | G06F 3/0418 |
| | | | | 345/419 |
| 2013/0010059 A1* | 1/2013 | Kobayashi | | G06T 19/20 |
| | | | | 348/E13.064 |
| 2013/0021458 A1* | 1/2013 | Inoue | | G02B 30/24 |
| | | | | 348/56 |
| 2013/0038606 A1* | 2/2013 | Ushiki | | H04N 13/351 |
| | | | | 348/46 |
| 2013/0050196 A1* | 2/2013 | Takashima | | H04N 13/376 |
| | | | | 345/419 |
| 2013/0050197 A1* | 2/2013 | Oosawa | | H04N 13/327 |
| | | | | 345/419 |
| 2013/0063576 A1* | 3/2013 | Okubo | | G02B 30/33 |
| | | | | 348/51 |
| 2013/0070052 A1* | 3/2013 | Yamashita | | H04N 13/178 |
| | | | | 348/43 |
| 2013/0107014 A1* | 5/2013 | Masuda | | H04N 13/239 |
| | | | | 348/47 |
| 2013/0148944 A1* | 6/2013 | Ando | | G11B 27/034 |
| | | | | 386/278 |
| 2013/0162641 A1* | 6/2013 | Zhang | | H04N 13/128 |
| | | | | 345/419 |
| 2013/0165186 A1* | 6/2013 | Choi | | H04N 13/128 |
| | | | | 455/566 |
| 2013/0169753 A1* | 7/2013 | Lee | | H04N 13/178 |
| | | | | 348/43 |
| 2013/0170737 A1* | 7/2013 | Arita | | H04N 13/239 |
| | | | | 382/154 |
| 2013/0187852 A1* | 7/2013 | Ebina | | H04N 13/398 |
| | | | | 345/158 |
| 2013/0194253 A1* | 8/2013 | Ohmi | | H04N 13/128 |
| | | | | 345/419 |
| 2013/0215106 A1* | 8/2013 | Yamaguchi | | H04N 13/128 |
| | | | | 345/419 |
| 2013/0215237 A1* | 8/2013 | Inoue | | H04N 13/204 |
| | | | | 345/419 |
| 2013/0229407 A1* | 9/2013 | Chiu | | H04N 13/31 |
| | | | | 345/419 |
| 2013/0242068 A1* | 9/2013 | Horiuchi | | G02B 27/0093 |
| | | | | 348/55 |
| 2013/0268882 A1* | 10/2013 | Roh | | G06F 3/04815 |
| | | | | 715/782 |

(56) References Cited

U.S. PATENT DOCUMENTS

| | | | | |
|---|---|---|---|---|
| 2013/0293446 | A1* | 11/2013 | Yoo | H04N 13/356 345/6 |
| 2014/0078273 | A1* | 3/2014 | Ono | G03B 35/26 348/54 |
| 2014/0085442 | A1* | 3/2014 | Ono | H04N 13/337 348/54 |
| 2014/0143733 | A1* | 5/2014 | Jung | H04N 13/261 715/848 |
| 2014/0146143 | A1* | 5/2014 | Park | H04N 13/351 348/51 |
| 2014/0300711 | A1* | 10/2014 | Kroon | H04N 13/307 348/51 |
| 2014/0354796 | A1* | 12/2014 | Hein | G02B 21/086 359/385 |
| 2015/0036211 | A1* | 2/2015 | Chen | G02B 30/31 359/462 |
| 2015/0334369 | A1* | 11/2015 | Bruls | H04N 13/128 348/43 |
| 2016/0070112 | A1* | 3/2016 | Song | G02B 30/40 359/471 |
| 2016/0077349 | A1* | 3/2016 | An | H04N 13/351 359/462 |
| 2016/0150209 | A1* | 5/2016 | Dadash Pour | H04N 13/128 348/51 |
| 2016/0191904 | A1* | 6/2016 | An | G02B 30/27 348/51 |
| 2016/0219258 | A1* | 7/2016 | Woodgate | H04N 23/661 |
| 2016/0234482 | A1* | 8/2016 | Bickerstaff | H04N 13/128 |
| 2016/0241842 | A1* | 8/2016 | Newbery | G03B 35/10 |
| 2016/0360187 | A1* | 12/2016 | Smithwick | G02B 30/27 |
| 2017/0038598 | A1* | 2/2017 | Song | G02B 30/36 |
| 2017/0041596 | A1* | 2/2017 | Park | H04N 13/305 |
| 2017/0078652 | A1* | 3/2017 | Hua | G06V 20/20 |
| 2017/0289518 | A1* | 10/2017 | Kim | H04N 13/239 |
| 2017/0366797 | A1* | 12/2017 | Kim | H04N 13/128 |
| 2018/0007349 | A1* | 1/2018 | Lee | G02B 30/27 |
| 2019/0180514 | A1* | 6/2019 | Sasaki | H04N 13/128 |
| 2020/0029067 | A1* | 1/2020 | Lee | H04N 13/383 |
| 2020/0126494 | A1* | 4/2020 | Chen | G09G 5/10 |
| 2020/0201036 | A1* | 6/2020 | Hong | B60R 1/31 |
| 2021/0132693 | A1* | 5/2021 | Pulli | G02B 27/0093 |
| 2021/0136354 | A1* | 5/2021 | Valli | G02B 27/017 |
| 2021/0314542 | A1* | 10/2021 | Jung | H04N 13/122 |
| 2022/0087813 | A1* | 3/2022 | Burge | G02C 7/104 |
| 2022/0264076 | A1* | 8/2022 | Makinen | G02B 30/26 |
| 2022/0277522 | A1* | 9/2022 | Katsuki | H04N 17/00 |
| 2022/0385880 | A1* | 12/2022 | Nims | H04N 13/271 |
| 2024/0118550 | A1* | 4/2024 | Lai | G02B 27/0172 |
| 2024/0169673 | A1* | 5/2024 | Xiong | G06T 17/205 |
| 2024/0187561 | A1* | 6/2024 | Tomizawa | H04N 13/32 |
| 2024/0221276 | A1* | 7/2024 | Foda | H04N 13/128 |
| 2024/0414309 | A1* | 12/2024 | He | H04N 13/279 |

FOREIGN PATENT DOCUMENTS

| | | |
|---|---|---|
| CN | 114387324 | 4/2022 |
| TW | 201518847 | 5/2015 |
| TW | 201815162 | 4/2018 |
| TW | 202201348 | 1/2022 |

* cited by examiner

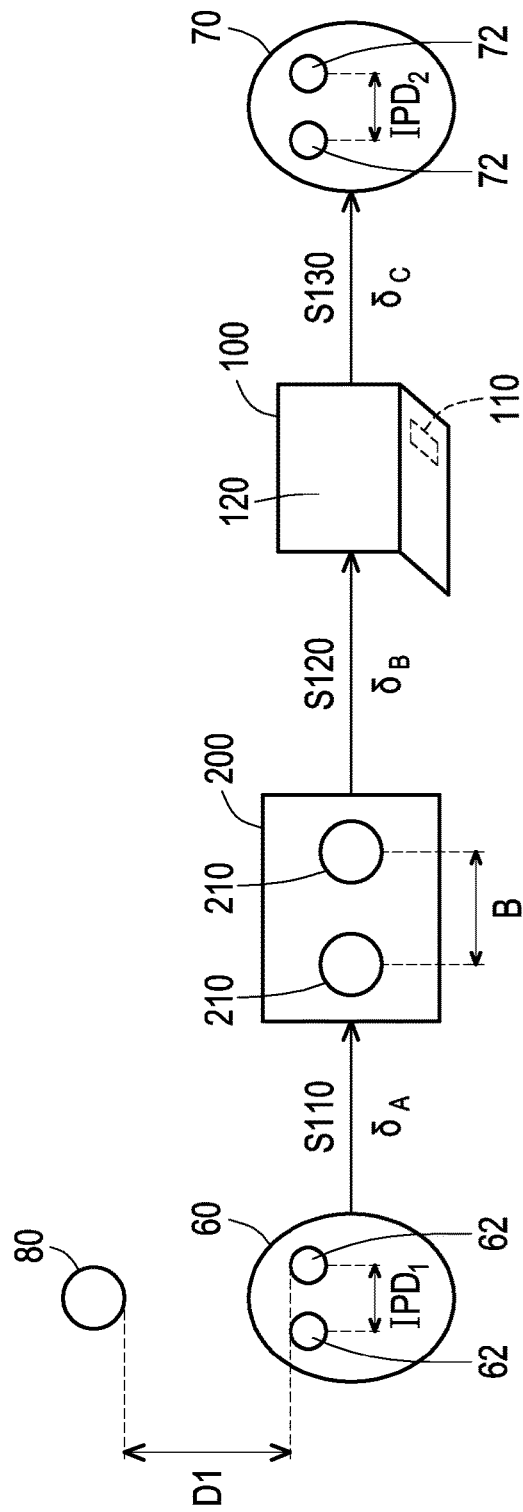
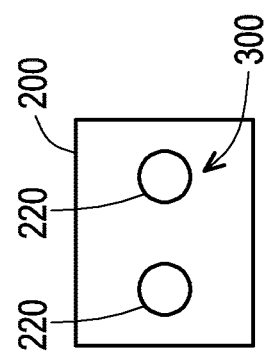
FIG. 3A
FIG. 3B

METHOD AND DEVICE FOR ADJUSTING DEPTH OF STEREOSCOPIC IMAGE

CROSS-REFERENCE TO RELATED APPLICATION

This application claims the priority benefit of Taiwan application serial no. 111150471, filed on Dec. 28, 2022. The entirety of the above-mentioned patent application is hereby incorporated by reference herein and made a part of this specification.

BACKGROUND

Technical Field

The disclosure relates to a method and device for adjusting an image, and particularly relates to a method and device for adjusting a depth of a stereoscopic image.

Description of Related Art

The interpupillary distance (IPD) of each person is quite different. For people with a large IPD, a stereoscopic feeling when seeing ordinary objects is more prominent compared with people with a small IPD. For this reason, when using a stereoscopic display product, such as a virtual reality display (VR display), an augmented reality display (AR display), a stereoscopic TV, inputting the IPD of a seer or a user into a software is required to achieve a realistic stereoscopic size and feeling. As in the stereoscopic TV field, image sources photographed by different users have different depth records. When another user sees through a stereoscopic display, since two users have different IPDs, perceived depths are also different.

SUMMARY

The disclosure provides a method for adjusting a depth of a stereoscopic image, which enables users with different interpupillary distances (IPDs), or stereoscopic image photographers and stereoscopic display viewers all to see stereoscopic images with the same depth effect.

The disclosure provides a device for adjusting a depth of a stereoscopic image, which enables users with different IPDs, or stereoscopic image photographers and stereoscopic display viewers all to see stereoscopic images with the same depth effect.

An embodiment of the disclosure provides a method for adjusting a depth of a stereoscopic image, which includes the following. A first disparity correction amount is obtained according to a distance between centers of two lenses of a stereoscopic camera and an IPD of a first observer, in which a stereoscopic image distance formed after adding the first disparity correction amount to a disparity of a stereoscopic image of an object photographed by the stereoscopic camera is equal to a distance of the first observer seeing the object. A second disparity correction amount is obtained according to a difference between image distances of a stereoscopic display and the stereoscopic camera at zero disparity, in which a stereoscopic image distance formed after adding the second disparity correction amount to a disparity of a stereoscopic image displayed by the stereoscopic display is equal to a stereoscopic image distance provided by the stereoscopic camera. A third disparity correction amount is obtained according to the IPD of the first observer and an IPD of a second observer, in which a stereoscopic image distance formed after adding the first disparity correction amount, the second disparity correction amount, and the third disparity correction amount to the disparity of the stereoscopic image displayed by the stereoscopic display is equal to the distance of the first observer seeing the object. A stereoscopic image of the object photographed by the stereoscopic camera which has been corrected by the first disparity correction amount, the second disparity correction amount, and the third disparity correction amount is transmitted to the stereoscopic display.

An embodiment of the disclosure provides a device for adjusting a depth of a stereoscopic image, which includes at least one controller used to receive a stereoscopic image signal from a stereoscopic camera and to control a display content of a stereoscopic display. The controller is configured to execute the following: obtain a first disparity correction amount according to a distance between centers of two lenses of the stereoscopic camera and an IPD of a first observer, in which a stereoscopic image distance formed after adding the first disparity correction amount to a disparity of a stereoscopic image of an object photographed by the stereoscopic camera is equal to a distance of the first observer seeing the object; obtain a second disparity correction amount according to a difference between image distances of the stereoscopic display and the stereoscopic camera at zero disparity, in which a stereoscopic image distance formed after adding the second disparity correction amount to a disparity of a stereoscopic image displayed by the stereoscopic display is equal to a stereoscopic image distance provided by the stereoscopic camera; obtain a third disparity correction amount according to the IPD of the first observer and an IPD of a second observer, in which a stereoscopic image distance formed after adding the first disparity correction amount, the second disparity correction amount, and the third disparity correction amount to the disparity of the stereoscopic image displayed by the stereoscopic display is equal to the distance of the first observer seeing the object; and transmit a stereoscopic image of the object photographed by the stereoscopic camera which has been corrected by the first disparity correction amount, the second disparity correction amount, and the third disparity correction amount to the stereoscopic display.

An embodiment of the disclosure provides a method for adjusting a depth of a stereoscopic image, which includes the following. A distance between centers of two lenses of a stereoscopic camera is adjusted to be the same as an IPD of a first observer, so that a stereoscopic image distance of an object photographed by the stereoscopic camera is equal to a distance of the first observer seeing the object. A first disparity correction amount is obtained according to a difference between image distances of a stereoscopic display and the stereoscopic camera at zero disparity, in which a stereoscopic image distance formed after adding the first disparity correction amount to a disparity of a stereoscopic image displayed by the stereoscopic display is equal to a stereoscopic image distance provided by the stereoscopic camera. A second disparity correction amount is obtained according to the IPD of the first observer and an IPD of a second observer, in which a stereoscopic image distance formed after adding the first disparity correction amount and the second disparity correction amount to the disparity of the stereoscopic image displayed by the stereoscopic display is equal to the distance of the first observer seeing the object. A stereoscopic image of the object photographed by the stereoscopic camera which has been corrected by the first disparity correction amount and the second disparity correction amount is transmitted to the stereoscopic display.

In the method for adjusting a depth of a stereoscopic image and the device for adjusting a depth of a stereoscopic image of the embodiments of the disclosure, the first disparity correction amount is obtained according to the distance between centers of the two lenses of the stereoscopic camera and the IPD of the first observer, the second disparity correction amount is obtained according to the difference between image distances of the stereoscopic display and the stereoscopic camera at zero disparity, the third disparity correction amount is obtained according to the IPD of the first observer and the IPD of the second observer, and the stereoscopic image of the object photographed by the stereoscopic camera which has been corrected by the first disparity correction amount, the second disparity correction amount, and the third disparity correction amount is transmitted to the stereoscopic display. Therefore, users with different IPDs, or stereoscopic image photographers and stereoscopic display viewers are all enabled to see stereoscopic images with the same depth effect. In the method for adjusting a depth of a stereoscopic image and the device for adjusting a depth of a stereoscopic image of the embodiments of the disclosure, the distance between centers of the two lenses of the stereoscopic camera is adjusted to be the same as the IPD of the first observer, the first disparity correction amount is obtained according to the difference between image distances of the stereoscopic display and the stereoscopic camera at zero disparity, the second disparity correction amount is obtained according to the IPD of the first observer and the IPD of the second observer, and the stereoscopic image of the object photographed by the stereoscopic camera which has been corrected by the first disparity correction amount and the second disparity correction amount is transmitted to the stereoscopic display. Therefore, users with different IPDs, or stereoscopic image photographers and stereoscopic display viewers are all enabled to see stereoscopic images with the same depth effect.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3A is a schematic diagram illustrating a part of a flow of the method for adjusting a depth of a stereoscopic image in FIG. 2.

FIG. 3B is a schematic diagram of another side of the stereoscopic camera in FIG. 3A.

DESCRIPTION OF THE EMBODIMENTS

Figure 1A:
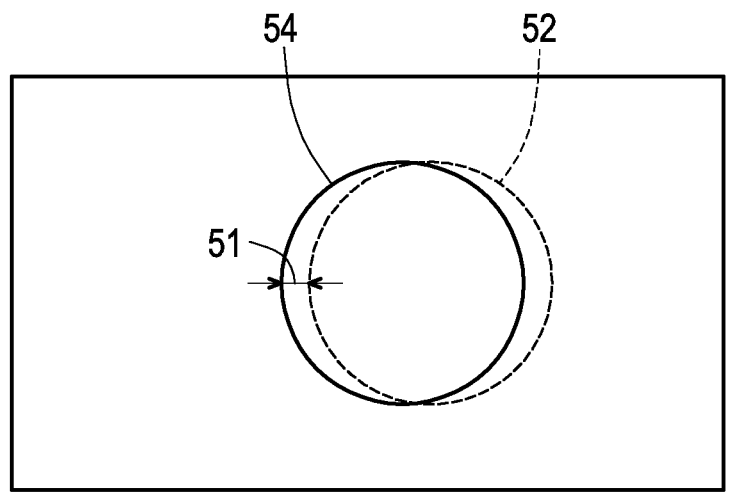
FIG. 1A, FIG. 1B, and FIG. 1C are schematic diagrams of a disparity on a stereoscopic display.
Figure 1B:
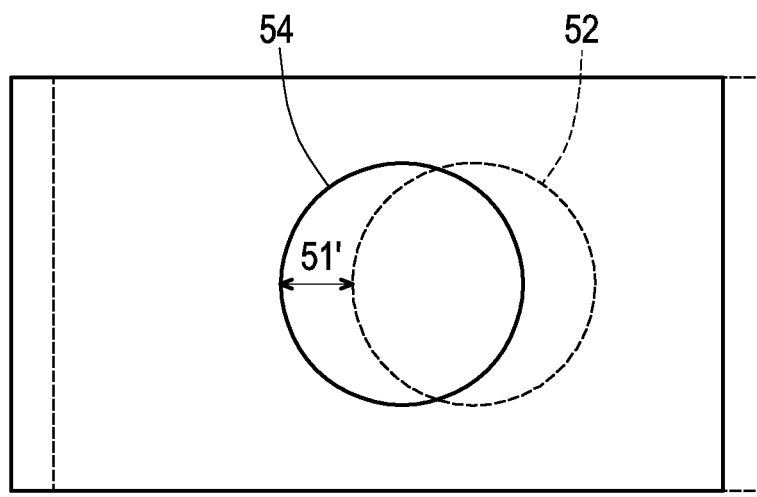
Figure 1C:
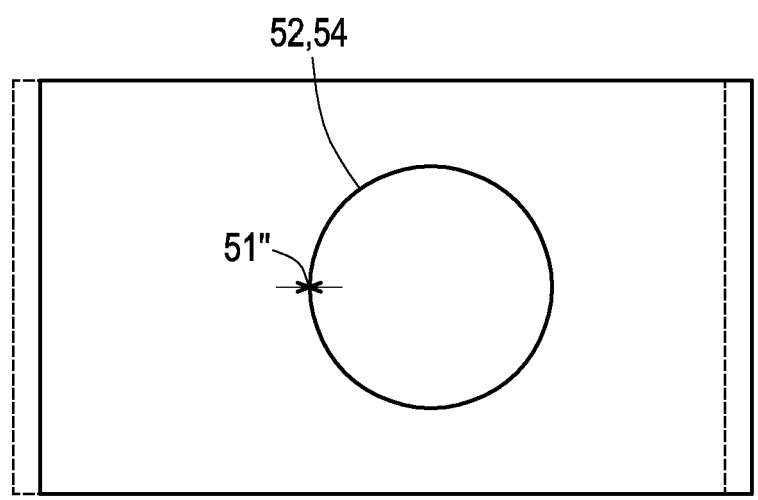

FIG. 1A, FIG. 1B, and FIG. 1C are schematic diagrams of a disparity on a stereoscopic display. Please refer to FIG. 1A, FIG. 1B and FIG. 1C. A depth of a stereoscopic image is mainly displayed by using a difference amount of a disparity 51 of two eyes, and the depth mentioned here is a distance between the stereoscopic image and the eyes felt by an observer. An image 52 and an image 54 are images projected to the left eye and the right eye, respectively. When the disparity 51 is large, a stereoscopic feeling generated is strong, which means that the stereoscopic image stands out (that is, the depth is small); on the contrary, when the disparity 51 is small, a stereo vision perception is minor, which means that the depth is large and the stereoscopic image is far away from a user.

If adjusting the depth of the stereoscopic image is desired, the difference amount of a disparity of two eyes may be used to increase a disparity between the image 52 and the image 54 (such as adjusting from the disparity 51 in FIG. 1A to a larger disparity 51' in FIG. 1B) so that the stereoscopic image may be made to stand out and be close to the user. On the other hand, as in FIG. 1C, if a disparity 51" is adjusted to 0, the depth of the stereoscopic image is on a display surface of the stereoscopic display.

Therefore, by adjusting the amount of the disparity, the depth of the stereoscopic image may be adjusted.

Figure 2:
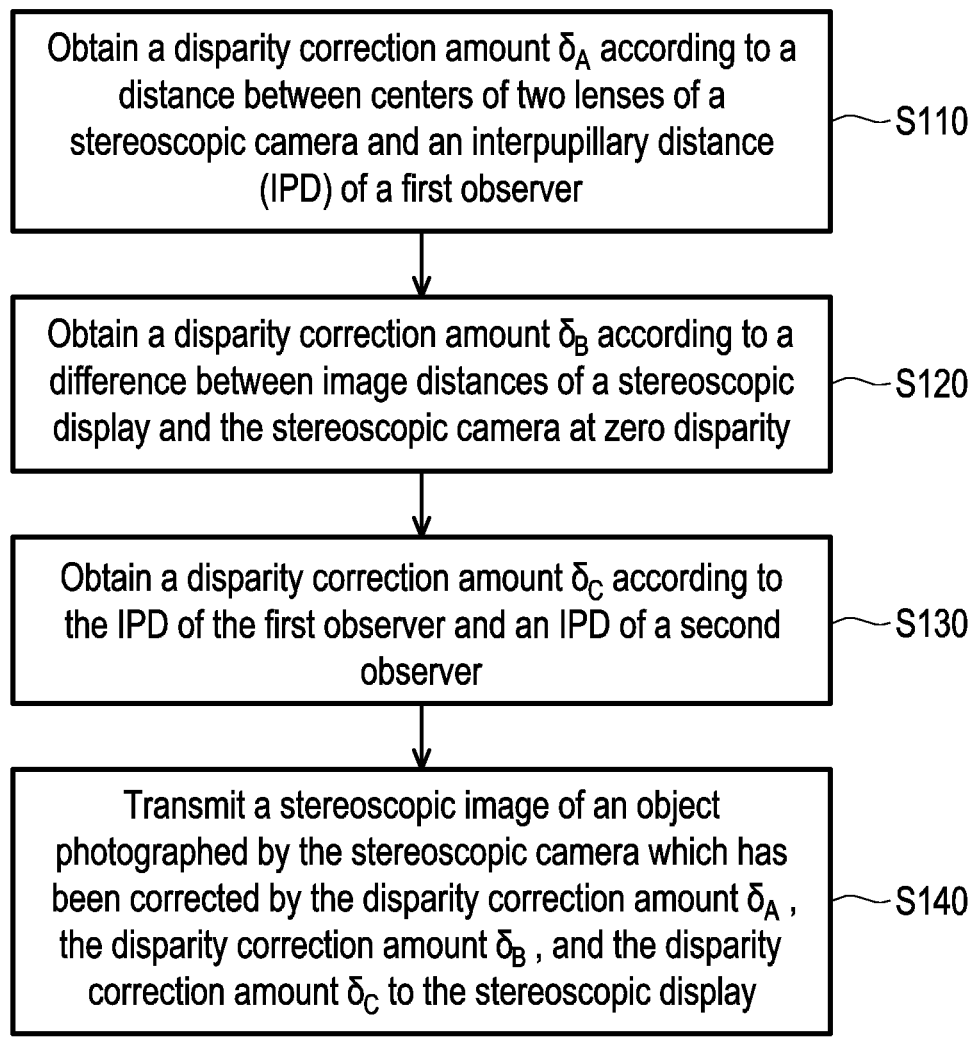
FIG. 2 is a flowchart of a method for adjusting a depth of a stereoscopic image according to an embodiment of the disclosure.

FIG. 2 is a flowchart of a method for adjusting a depth of a stereoscopic image according to an embodiment of the disclosure. FIG. 3A is a schematic diagram illustrating a part of a flow of the method for adjusting a depth of a stereoscopic image in FIG. 2. FIG. 3B is a schematic diagram of another side of a stereoscopic camera in FIG. 3A. Please refer to FIG. 2 and FIG. 3A first. This embodiment provides a device for adjusting a depth of a stereoscopic image 100, which includes at least one controller 110 (one of the at least one controller 110 is taken as an example in FIG. 3A) used to receive a stereoscopic image signal from a stereoscopic camera 200 and to control a display content of a stereoscopic display 120. The controller 110 is configured to execute Step S110 to Step S140 in FIG. 2. In other words, the method for adjusting a depth of a stereoscopic image of this embodiment includes Step S110 to Step S140, and it may be implemented by the device for adjusting a depth of the stereoscopic image 100 of this embodiment.

In the method for adjusting a depth of a stereoscopic image of this embodiment, Step S110 is first executed as follows. A disparity correction amount $\delta_A$ is obtained according to a distance B between centers of two lenses 210 of the stereoscopic camera 200 and an interpupillary distance (IPD) $IPD_1$ of a first observer 60, in which a stereoscopic image distance (that is, a distance between a stereoscopic image and eyes perceived by a user when seeing the stereoscopic image, that is, a depth of the stereoscopic image) formed after adding the disparity correction amount $\delta_A$ to a disparity of a stereoscopic image of an object 80 photographed by the stereoscopic camera 200 is equal to a distance D1 (that is, an actual distance between eyes 62 of the first observer 60 and the object 80) of the first observer 60 seeing the object 80.

Next, Step S120 is executed as follows. A disparity correction amount $\delta_B$ is obtained according to a difference between image distances of the stereoscopic display 120 and the stereoscopic camera 200 at zero disparity, in which a stereoscopic image distance formed after adding the disparity correction amount $\delta_B$ to a disparity of a stereoscopic image displayed by the stereoscopic display 120 is equal to a stereoscopic image distance provided by the stereoscopic camera 200.

Then, Step S130 is executed as follows. A disparity correction amount $\delta_C$ is obtained according to the IPD IPD$_1$ of the first observer 60 and an IPD IPD$_2$ (that is, a distance between pupils of two eyes 72 of a second observer 70) of the second observer 70, in which a stereoscopic image distance formed after adding the disparity correction amount $\delta_A$, the disparity correction amount $\delta_B$, and the disparity correction amount $\delta_C$ to the disparity of the stereoscopic image displayed by the stereoscopic display 120 is equal to the distance D1 of the first observer 60 seeing the object 80.

Afterward, Step S140 is executed as follows. A stereoscopic image of the object 80 photographed by the stereoscopic camera 200 which has been corrected by the disparity correction amount $\delta_A$, the disparity correction amount $\delta_B$, and the disparity correction amount $\delta_C$ is transmitted to the stereoscopic display 120.

In this embodiment, the stereoscopic camera 200 may be integrated with a virtual reality display 300 to display the stereoscopic image of the object 80 photographed by the stereoscopic camera 200. For example, the front of the stereoscopic camera 200 is provided with the lens 210, which is able to photograph the object 80, and the back of the stereoscopic camera 200 is provided with virtual image displays 220, and the observer 60 is able to see a stereoscopic image generated by virtual reality by aligning the two eyes 62 to the two virtual image displays 220 respectively. The method for adjusting a depth of a stereoscopic image further includes the following. A stereoscopic image of the object 80 photographed by the stereoscopic camera 200 which has been corrected by the disparity correction amount $\delta_A$ of the stereoscopic image is displayed by the virtual reality display 300, so that a stereoscopic image distance of a stereoscopic image seen by the first observer 60 through the virtual reality display 300 is equal to the distance D1 of the first observer 60 directly seeing the object 80.

In this embodiment, the disparity correction amount $\delta_A$, the disparity correction amount $\delta_B$, and the disparity correction amount $\delta_C$ may be calculated by a pixel difference, and the pixel difference refers to a distance of the number of pixels deviated. In addition, in this embodiment, the method of obtaining the disparity correction amount $\delta_A$, the disparity correction amount $\delta_B$, and the disparity correction amount $\delta_C$ is performed through calculation with triangulation. The calculation process of Steps S110, S120, and S130 will be described in detail below.

Figure 4:
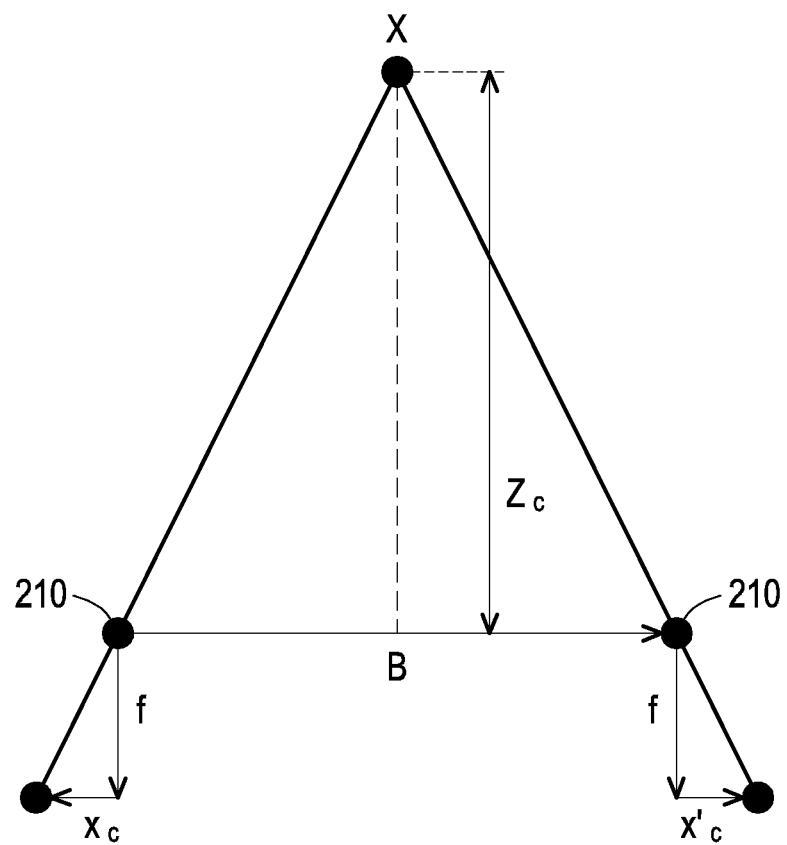
FIG. 4 and FIG. 5 are graphs used to calculate a disparity correction amount $\delta_A$ in FIG. 2.
Figure 5:
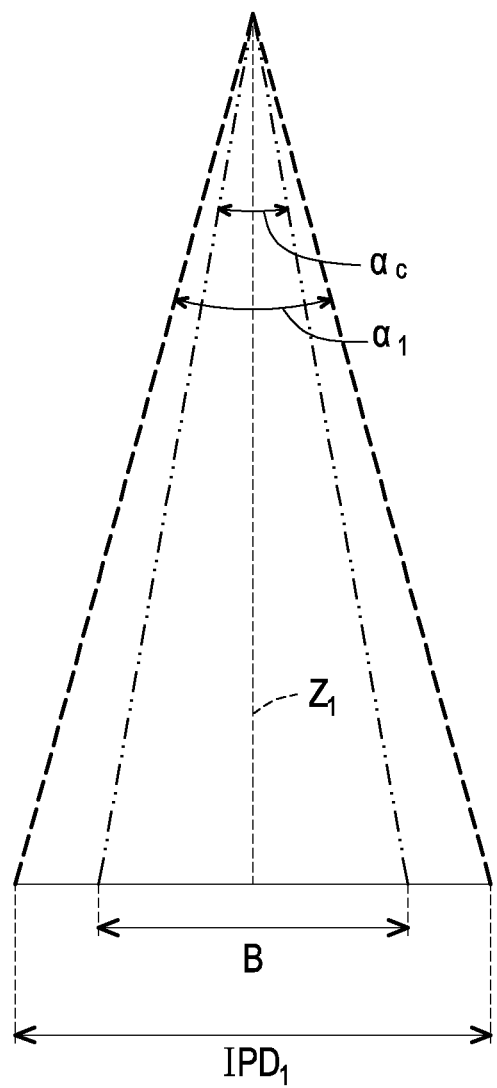

FIG. 4 and FIG. 5 are graphs used to calculate the disparity correction amount $\delta_A$ of FIG. 2. Please refer to FIG. 3A, FIG. 4, and FIG. 5. When calculating the disparity correction amount $\delta_A$, assuming that the first observer 60 utilizes the stereoscopic camera 200 to take a picture or record a video to generate a stereoscopic image file, but due to the IPD IPD$_1$ of the first observer 60 and the distance B between centers of the two lenses 210 of the stereoscopic camera 200 is different, so the disparity correction amount $\delta_A$ needs to be added at this time. Also, the following mathematical formula is used to calculate.

$$Z_c = \frac{fB}{(x_c - x'_c)} = \frac{fB}{\frac{1}{m_c}(u_L - u_R)} \quad \text{(Formula 1)}$$

$$m_c = \frac{\text{camera\_pixels}}{\text{mm}} \quad \text{(Formula 2)}$$

FIG. 4 is a simple structure diagram of the stereoscopic camera 200, B is the distance between centers of the two lenses 210 of the stereoscopic camera 200, X is a certain object point photographed, x and x' are actual projection positions on a photosensitive element of a camera, f is a focal length of the camera, and $m_c$ is a pixel density. For example, camera_pixels in Formula 2 is the number of pixels per millimeter (mm) on the photosensitive element. As in Formula 1, a depth $Z_c$ is composed of a pixel position difference ($u_L$-$u_R$) projected by X on a photo. That is, the depth may be adjusted by adjusting the pixel difference between the left eye and the right eye.

$$Z_c = \frac{B}{\tan\frac{\alpha_c}{2}} \quad \text{(Formula 3)}$$

$$\tan\frac{\alpha_c}{2} = \frac{(x_c - x'_c)}{2f} = \frac{\frac{1}{m_c}(u_L - u_R)}{2f} \quad \text{(Formula 4)}$$

$$Z_1 = \frac{IPD_1}{\tan\frac{\alpha_1}{2}} \quad \text{(Formula 5)}$$

$$Z_c = Z_1 \quad \text{(Formula 6)}$$

$$\alpha_1 = \alpha_c + \varphi_1 \quad \text{(Formula 7)}$$

$$\tan\frac{\varphi_1}{2} = \frac{\frac{IPD_1}{B} - 1}{\frac{1}{\tan\frac{\alpha_c}{2}} + \frac{IPD_1}{B}\tan\frac{\alpha_c}{2}} \quad \text{(Formula 8)}$$

$$Disparity_1 = (u_{1L} - u_{1R}) = (u_L - u_R + \delta_A) \quad \text{(Formula 9)}$$

$$\delta_A = PPD_{cm} \cdot \varphi_1 \quad \text{(Formula 10)}$$

Assuming that the stereoscopic camera 200 is integrated with the virtual reality display 300, the first observer 60 sees a content photographed by oneself through the virtual reality display 300. The IPD IPD$_1$ of the first observer 60 is different from B, as in FIG. 5. Since a stereoscopic image distance is generated by a disparity, and a virtual image imaging distance of the virtual reality display 300 may be infinite, it is necessary to convert the unit of the disparity from mm into an angle deg. A difference amount of the disparity is φ1, as in Formula 7. Also, the purpose is that a depth $Z_1$ seen by the first observer 60 is equal to the depth $Z_c$ photographed. From Formula 3 and Formula 5, Formula 8 may be obtained to obtain φ1. In addition, φ1 is converted into a pixel difference (i.e., the disparity correction amount $\delta_A$), as in Formula 10, and the conversion of the angle into the pixel is calculated by the pixel per deg PPD$_{cm}$ of the virtual reality display 300. In this way, a difference amount of the pixel difference $\delta_A$ may be increased. That is, a depth photographed by the stereoscopic camera 200 is the same as a depth seen by the first observer 60. A new disparity Disparity$_1$ (i.e., ($u_{1L}$-$u_{1R}$)) is described as in Formula 9.

Figure 6:
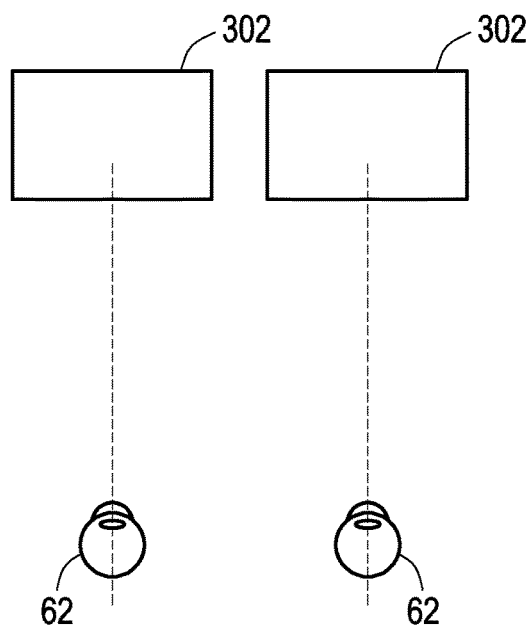
FIG. 6, FIG. 7, and FIG. 8 are graphs used to calculate a disparity correction amount $\delta_B$ in FIG. 2.
Figure 7:
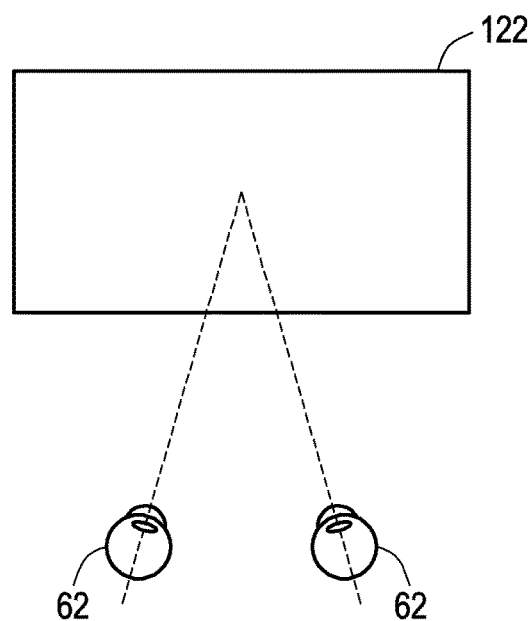
Figure 8:
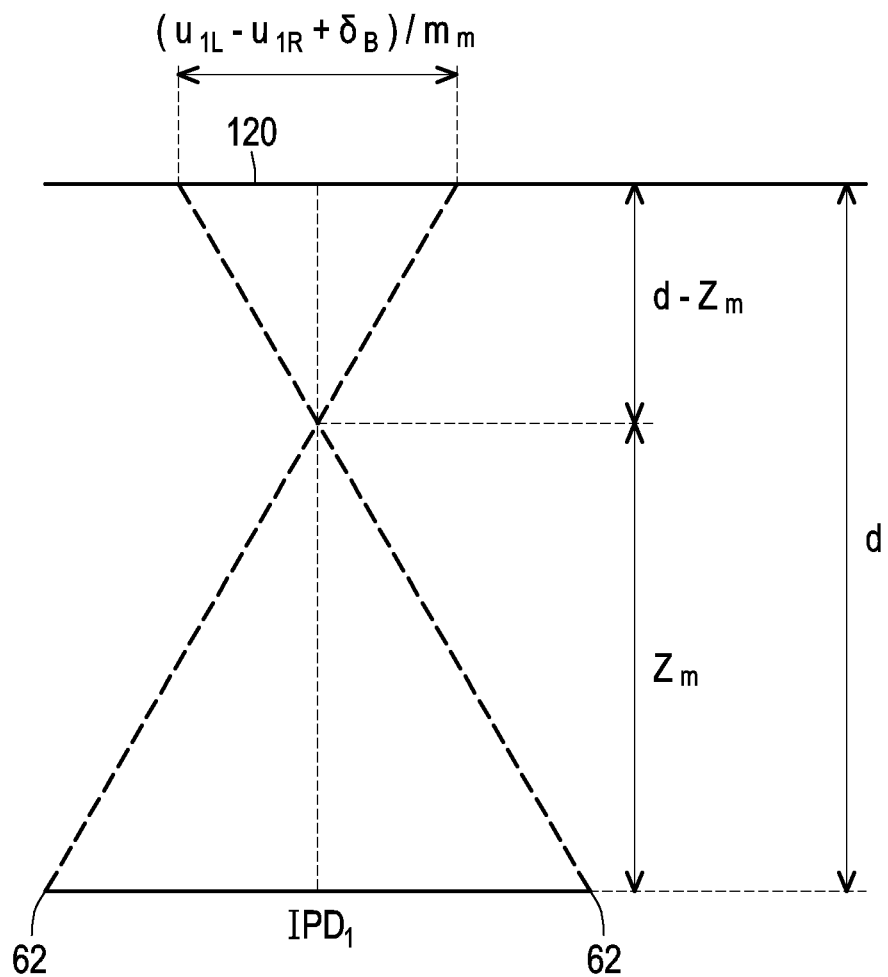

FIG. 6, FIG. 7, and FIG. 8 are graphs used to calculate the disparity correction amount $\delta_B$ in FIG. 2. Please refer to FIG. 3A, FIG. 6, FIG. 7, and FIG. 8. When calculating the disparity correction amount $\delta_A$, as illustrated in FIG. 6, since placements of the virtual reality display 300 and the stereoscopic camera 200 are parallel placements, under such a structure, when the disparity is 0, the equivalent is a two-dimensional plane 302, and the two-dimensional plane 302 is at infinity. However, since when the disparity of the stereoscopic display 120 is 0, when the equivalent is a two-dimensional plane, the two-dimensional plane is not at infinity, but on a display surface 122 of the display, and a distance is d, so in a situation of the same disparity amount, when images at other positions or at different depths are projected on the stereoscopic display 120, the distance also changes, like as changing from infinity to d when the disparity is zero. Therefore, the disparity correction amount $\delta_B$ needs to be added. That is to say, the image distance of the stereoscopic camera 200 at zero disparity is infinite, and the image distance of the stereoscopic display 120 at zero disparity is a finite value. Step S120 includes calculating the disparity correction amount $\delta_B$ according to the finite value.

$$m_m = \frac{\text{monitor\_pixels}}{\text{mm}} \quad \text{(Formula 11)}$$

$$\frac{Z_m}{IPD_1} = \frac{d - Z_m}{\frac{1}{m_m}(u_{1L} - u_{1R} + \delta_B)} \quad \text{(Formula 12)}$$

$$Z_m = \frac{d}{\frac{\frac{1}{m_m}(u_{1L} - u_{1R} + \delta_B)}{IPD_1} + 1} \quad \text{(Formula 13)}$$

$$Z_m = Z_1 \quad \text{(Formula 14)}$$

$$\frac{d}{\frac{\frac{1}{m_m}(u_{1L} - u_{1R} + \delta_B)}{IPD_1} + 1} = \frac{IPD_1}{\tan\frac{(u_{1L} - u_{1R})}{2PPD_{cm}}} \quad \text{(Formula 15)}$$

$$\delta_B = m_m d \tan\frac{(u_{1L} - u_{1R})}{2PPD_{cm}} - m_m IPD_1 - (u_{1L} - u_{1R}) \quad \text{(Formula 16)}$$

$$\text{Disparity}_m = (u_{1L} - u_{1R} + \delta_B) \quad \text{(Formula 17)}$$

As in FIG. 8, $\delta_B$ is added to a disparity content projected on the stereoscopic display 120. In addition, the pixel density of the stereoscopic display 120 is $m_m$, and monitor_pixels is the number of pixels per mm of the stereoscopic display 120. Assuming that the observer is the same, that is, the first observer 60 sees the stereoscopic display 120, and a resulting stereoscopic depth is $Z_m$. From Formula 14, of which the objective is that a seen depth is equal to the depth when seeing the virtual reality display 300, and then the difference amount $\delta_B$ is obtained.

Formula 12 may be obtained from similar triangles, and $Z_m$ may be obtained after arrangement, as Formula 13. Formula 15 may be obtained from Formula 14, and $\delta_B$ may be obtained after arrangement, as Formula 16. A new disparity amount $\text{Disparity}_m$ (i.e., ($u_{mL}$-$u_{mR}$)) is as described in Formula 17.

Figure 9:
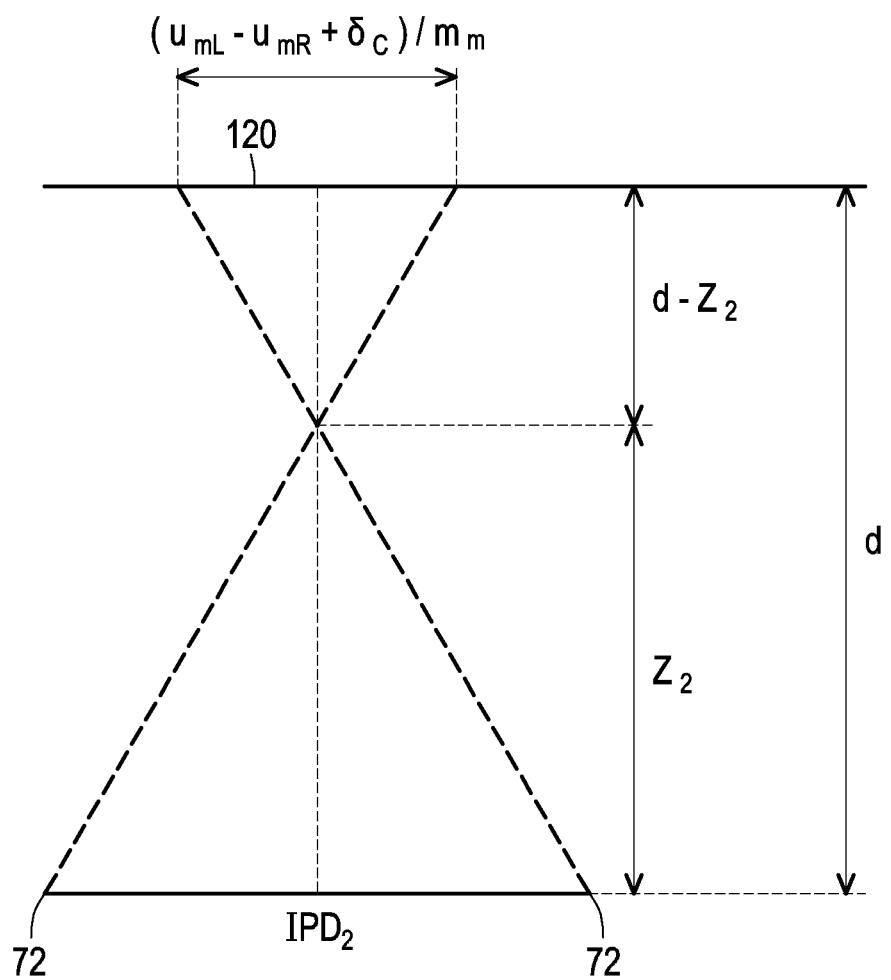
FIG. 9 is a graph for calculating a disparity correction amount $\delta_C$ in FIG. 2.

FIG. 9 is a graph for calculating the disparity correction amount $\delta_C$ in FIG. 2. Please refer to FIG. 3A and FIG. 9. When calculating the disparity correction amount $\delta_C$, assuming that it is the second observer 70 who sees the stereoscopic display 120, and since the second observer 70 and the first observer 60 have different IPDs, which are $IPD_2$ and $IPD_1$ respectively, the correction amount $\delta_C$ needs to be added.

$$\frac{Z_2}{IPD_2} = \frac{d - Z_2}{\frac{1}{m_m}(u_{mL} - u_{mR} + \delta_C)} \quad \text{(Formula 18)}$$

$$Z_m = \frac{d}{\frac{\frac{1}{m_m}(u_{mL} - u_{mR} + \delta_C)}{IPD_2} + 1} \quad \text{(Formula 19)}$$

$$Z_2 = Z_m \quad \text{(Formula 20)}$$

$$\frac{d}{\frac{\frac{1}{m_m}(u_{mL} - u_{mR} + \delta_C)}{IPD_2} + 1} = \frac{d}{\frac{\frac{1}{m_m}(u_{mL} - u_{mR})}{IPD_1} + 1} \quad \text{(Formula 21)}$$

$$\delta_C = \left(\frac{IPD_2}{IPD_1} - 1\right)(u_{mL} - u_{mR}) \quad \text{(Formula 22)}$$

$$\text{Disparity}_2 = (u_{mL} - u_{mR} + \delta_C) \quad \text{(Formula 23)}$$

As in FIG. 12, a $\delta_C$ is added and the IPD of the second observer 70 is $IPD_2$, and an stereoscopic visual distance is $Z_2$. Formula 18 may be obtained from similar triangles, and $Z_2$ may be obtained after arrangement, as Formula 19. Since the object is for the second observer 70 and the first observer 60 to feel the same stereoscopic depth, as in Formula 20, Formula 21 may be obtained, and Formula 22 may be obtained after arrangement. The increased amount of the disparity is $\delta_C$. A new disparity $\text{Disparity}_2$ (i.e. ($u_{2L}$-$u_{2R}$)) is as described in Formula 23.

After a series of derivations, $\delta_A$, $\delta_B$, and $\delta_C$ may be obtained. Then, the disparity of the second observer 70 may be obtained by adding $\delta A$, $\delta_B$, and $\delta_C$ to the disparity photographed by the first observer 60, and the stereoscopic depth seen by the two observers may be the same.

In an embodiment, the controller 110 is, for example, a central processing unit (CPU), a microprocessor, a digital signal processor (DSP), a programmable controller, a programmable logic device (PLD) or other similar devices or a combination of the devices, and the disclosure is not limited thereto. In addition, in an embodiment, each function of the controller 110 may be implemented as a plurality of program codes. These program codes are stored in a memory and are executed by the controller 110. Alternatively, in an embodiment, each function of the controller 110 may be implemented as one or more circuits. The disclosure does not limit the implementation of the functions of the controller 110 by means of software or hardware.

In this embodiment, the device for adjusting a depth of a stereoscopic image 100 may be a notebook computer, and the controller 110 is, for example, the CPU of the notebook computer, and the stereoscopic display 120 is, for example, the display of the notebook computer, but the disclosure is not limited thereto. In other embodiments, the controller 110 may also be separated from the stereoscopic display 120 and be positioned on another server or desktop computer. In addition, there may be a plurality of controllers 110, and a controller performing Step S110 may be positioned on the stereoscopic camera 200, while a controller performing Steps S120 to S140 may be positioned on a notebook computer, a server or a desktop computer.

Figure 10:
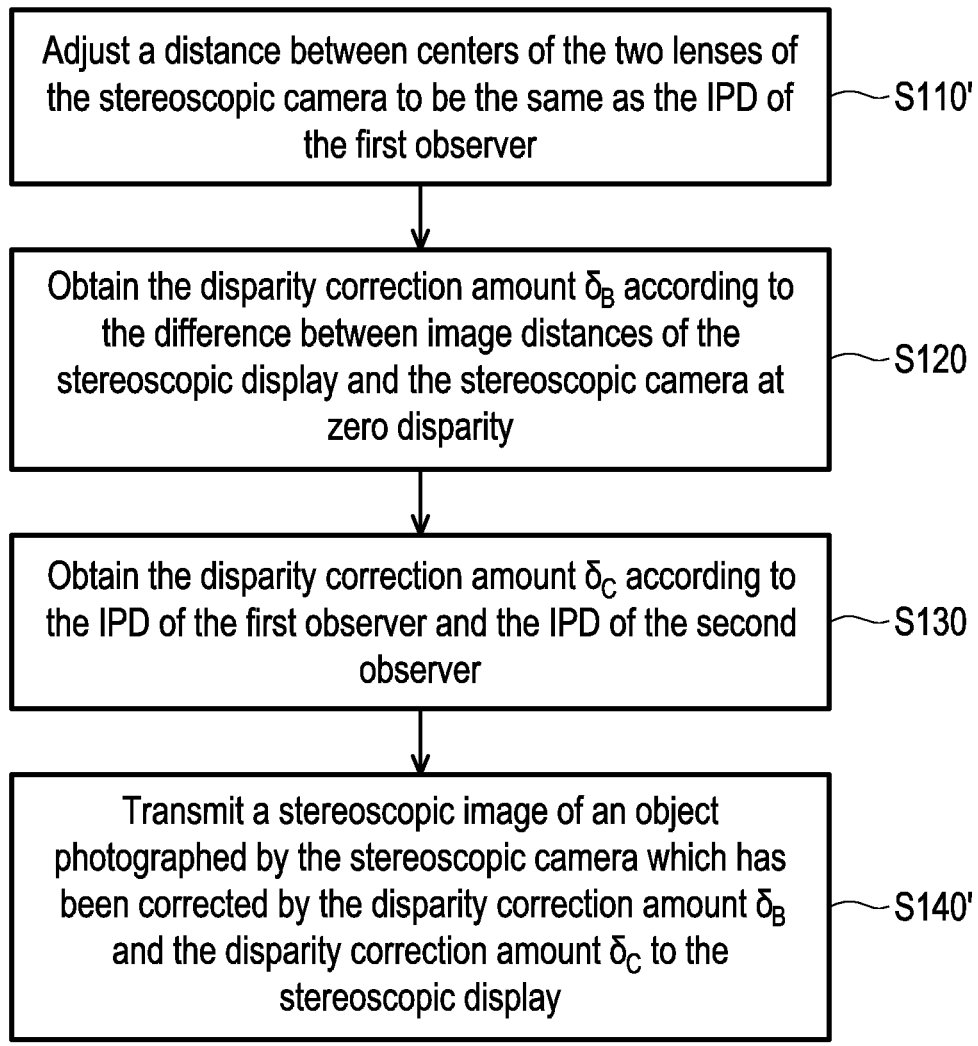
FIG. 10 is a flowchart of a method for adjusting a depth of a stereoscopic image according to another embodiment of the disclosure.
Figure 11:
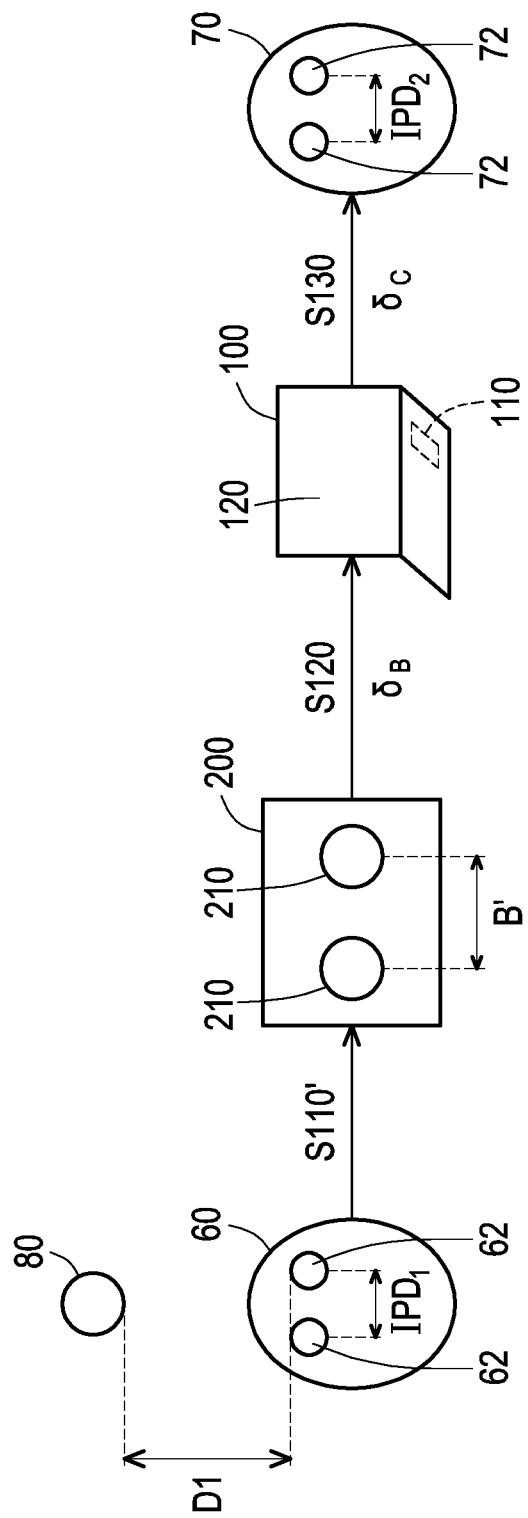
FIG. 11 is a schematic diagram illustrating a part of a flow of the method for adjusting a depth of a stereoscopic image shown in FIG. 10.

FIG. 10 is a flowchart of a method for adjusting a depth of a stereoscopic image according to another embodiment of the disclosure, and FIG. 11 is a schematic diagram illustrating a part of a flow of the method for adjusting a depth of a stereoscopic image in FIG. 10. Please refer to FIG. 10 and FIG. 11. The method for adjusting a depth of a stereoscopic image of this embodiment is similar to the method for adjusting a depth of a stereoscopic image in FIG. 2, while a difference is as the following. In this embodiment, a distance B' between centers of the two lenses 210 of the stereoscopic camera 200 is adjustable, for example, may be adjusted by a mechanism. In Step S110' of the method for adjusting a depth of a stereoscopic image of this embodiment, the distance B' between centers of the two lenses 210 of the stereoscopic camera 200 is adjusted to be the same as the IPD $IPD_1$ of the first observer 60, so that a stereoscopic image distance of an object photographed by the stereoscopic camera 200 is equal to the distance D1 of the first observer 60 seeing the object. In this way, after such adjustment, it may be considered that the disparity correction amount $\delta_A$ is zero. In this case, in Step S140', there is no need to consider the disparity correction amount $\delta_A$, so step S140' may be to transmit a stereoscopic image of the object 80 photographed by the stereoscopic camera 200 which has been corrected by the disparity correction amount $\delta_B$ and the disparity correction amount $\delta_C$ to the stereoscopic display 120. In addition, the device for adjusting a depth of a stereoscopic image 100 of the embodiment of the disclosure may also be used to implement the method for adjusting a depth of a stereoscopic image shown in FIG. 10.

In summary, in the method for adjusting a depth of a stereoscopic image and the device for adjusting a depth of a stereoscopic image of the embodiments of the disclosure, the disparity correction amount $\delta_A$ is obtained according to the distance between centers of the two lenses of the stereoscopic camera and the IPD of the first observer, the disparity correction amount $\delta_B$ is obtained according to the difference between image distances of the stereoscopic display and the stereoscopic camera at zero disparity, the disparity correction amount $\delta_C$ is obtained according to the IPD of the first observer and the IPD of the second observer, and the stereoscopic image of the object photographed by the stereoscopic camera which has been corrected by the disparity correction amount $\delta_A$, the disparity correction amount $\delta_B$, and the disparity correction amount $\delta_C$ is transmitted to the stereoscopic display. Therefore, users with different IPDs, or stereoscopic image photographers and stereoscopic display viewers are all enabled to see stereoscopic images with the same depth effect. In the method for adjusting a depth of a stereoscopic image and the device for adjusting a depth of a stereoscopic image of the embodiments of the disclosure, the distance between centers of the two lenses of the stereoscopic camera is adjusted to be the same as the IPD of the first observer, the disparity correction amount $\delta_B$ is obtained according to the difference between image distances of the stereoscopic display and the stereoscopic camera at zero disparity, a disparity correction amount $\delta_C$ is obtained according to the IPD of the first observer and the IPD of the second observer, and the stereoscopic image of the object photographed by the stereoscopic camera which has been corrected by the disparity correction amount $\delta_B$ and the disparity correction amount $\delta_C$ is transmitted to the stereoscopic display. Therefore, users with different IPDs, or stereoscopic image photographers and stereoscopic display viewers are all enabled to see stereoscopic images with the same depth effect.

What is claimed is:

1. A method for adjusting a depth of a stereoscopic image, comprising:
    obtaining a first disparity correction amount according to a distance between centers of two lenses of a stereoscopic camera and an interpupillary distance (IPD) of a first observer, wherein a stereoscopic image distance formed after adding the first disparity correction amount to a disparity of a stereoscopic image of an object photographed by the stereoscopic camera is equal to a distance of the first observer seeing the object;
    obtaining a second disparity correction amount according to a difference between image distances of a stereoscopic display and the stereoscopic camera at zero disparity, wherein a stereoscopic image distance formed after adding the second disparity correction amount to a disparity of a stereoscopic image displayed by the stereoscopic display is equal to a stereoscopic image distance provided by the stereoscopic camera;
    obtaining a third disparity correction amount according to the IPD of the first observer and an IPD of a second observer, wherein a stereoscopic image distance formed after adding the first disparity correction amount, the second disparity correction amount, and the third disparity correction amount to the disparity of the stereoscopic image displayed by the stereoscopic display is equal to the distance of the first observer seeing the object; and
    transmitting a stereoscopic image of the object photographed by the stereoscopic camera which has been corrected by the first disparity correction amount, the second disparity correction amount, and the third disparity correction amount to the stereoscopic display.

2. The method for adjusting the depth of the stereoscopic image according to claim 1, further comprising calculating the first disparity correction amount, the second disparity correction amount, and the third disparity correction amount by a pixel difference.

3. The method for adjusting the depth of the stereoscopic image according to claim 1, wherein the stereoscopic camera is integrated with a virtual reality display to display the stereoscopic image of the object photographed by the stereoscopic camera, wherein the method for adjusting the depth of the stereoscopic image further comprises displaying, by the virtual reality display, a stereoscopic image of the object photographed by the stereoscopic camera which has been corrected by the first disparity correction amount, so that a stereoscopic image distance of the stereoscopic image seen by the first observer through the virtual reality display is equal to a distance of the first observer directly seeing the object.

4. The method for adjusting the depth of the stereoscopic image according to claim 1, wherein the image distance of the stereoscopic camera at zero disparity is infinite, and the image distance of the stereoscopic display at zero disparity is a finite value.

5. The method for adjusting the depth of the stereoscopic image according to claim 4, wherein obtaining the second disparity correction amount according to the difference between the image distances of the stereoscopic display and the stereoscopic camera at zero disparity comprises calculating the second disparity correction amount according to the finite value.

6. The method for adjusting the depth of the stereoscopic image according to claim 1, wherein the method for obtaining the first disparity correction amount, the second disparity correction amount, and the third disparity correction amount is performed through calculation with triangulation.

7. A device for adjusting a depth of a stereoscopic image, comprising:

at least one controller configured to receive a stereoscopic image signal from a stereoscopic camera and to control a display content of a stereoscopic display, wherein the controller is configured to:
- obtain a first disparity correction amount according to a distance between centers of two lenses of the stereoscopic camera and an IPD of a first observer, wherein a stereoscopic image distance formed after adding the first disparity correction amount to a disparity of a stereoscopic image of an object photographed by the stereoscopic camera is equal to a distance of the first observer seeing the object;
- obtain a second disparity correction amount according to a difference between image distances of the stereoscopic display and the stereoscopic camera at zero disparity, wherein a stereoscopic image distance formed after adding the second disparity correction amount to a disparity of a stereoscopic image displayed by the stereoscopic display is equal to a stereoscopic image distance provided by the stereoscopic camera;
- obtain a third disparity correction amount according to the IPD of the first observer and an IPD of a second observer, wherein a stereoscopic image distance formed after adding the first disparity correction amount, the second disparity correction amount, and the third disparity correction amount to the disparity of the stereoscopic image displayed by the stereoscopic display is equal to the distance of the first observer seeing the object; and
- transmit a stereoscopic image of the object photographed by the stereoscopic camera which has been corrected by the first disparity correction amount, the second disparity correction amount, and the third disparity correction amount to the stereoscopic display.

8. The device for adjusting the depth of the stereoscopic image according to claim 7, wherein the controller is further configured to: calculate the first disparity correction amount, the second disparity correction amount, and the third disparity correction amount by a pixel difference.

9. The device for adjusting the depth of the stereoscopic image according to claim 7, wherein the stereoscopic camera is integrated with a virtual reality display to display the stereoscopic image of the object photographed by the stereoscopic camera, wherein the controller is further configured to: display, by the virtual reality display, a stereoscopic image of the object photographed by the stereoscopic camera which has been corrected by the first disparity correction amount, so that a stereoscopic image distance of the stereoscopic image seen by the first observer through the virtual reality display is equal to a distance of the first observer directly seeing the object.

10. The device for adjusting the depth of the stereoscopic image according to claim 7, wherein the image distance of the stereoscopic camera at zero disparity is infinite, and the image distance of the stereoscopic display at zero disparity is a finite value.

11. The device for adjusting the depth of the stereoscopic image according to claim 10, wherein obtaining the second disparity correction amount according to the difference between the image distances of the stereoscopic display and the stereoscopic camera at zero disparity comprises calculating the second disparity correction amount according to the finite value.

12. The device for adjusting the depth of the stereoscopic image according to claim 7, wherein the method for obtaining the first disparity correction amount, the second disparity correction amount, and the third disparity correction amount is performed through calculation with triangulation.

13. A method for adjusting a depth of a stereoscopic image, comprising:
- adjusting a distance between centers of two lenses of a stereoscopic camera to be the same as an IPD of a first observer, so that a stereoscopic image distance of an object photographed by the stereoscopic camera is equal to a distance of the first observer seeing the object;
- obtaining a first disparity correction amount according to a difference between image distances of a stereoscopic display and the stereoscopic camera at zero disparity, wherein a stereoscopic image distance formed after adding the first disparity correction amount to a disparity of a stereoscopic image displayed by the stereoscopic display is equal to a stereoscopic image distance provided by the stereoscopic camera;
- obtaining a second disparity correction amount according to the IPD of the first observer and an IPD of a second observer, wherein a stereoscopic image distance formed after adding the first disparity correction amount and the second disparity correction amount to the disparity of the stereoscopic image displayed by the stereoscopic display is equal to the distance of the first observer seeing the object; and
- transmitting a stereoscopic image of the object photographed by the stereoscopic camera which has been corrected by the first disparity correction amount and the second disparity correction amount to the stereoscopic display.

14. The method for adjusting the depth of the stereoscopic image according to claim 13, further comprising calculating the first disparity correction amount and the second disparity correction amount by a pixel difference.

15. The method for adjusting the depth of the stereoscopic image according to claim 13, wherein the stereoscopic camera is integrated with a virtual reality display to display the stereoscopic image of the object photographed by the stereoscopic camera.

16. The method for adjusting the depth of the stereoscopic image according to claim 13, wherein the image distance of the stereoscopic camera at zero disparity is infinite, and the image distance of the stereoscopic display at zero disparity is a finite value.

17. The method for adjusting the depth of the stereoscopic image according to claim 16, wherein obtaining the first disparity correction amount according to the difference between the image distances of the stereoscopic display and the stereoscopic camera at zero disparity comprises calculating the first disparity correction amount according to the finite value.

18. The method for adjusting the depth of the stereoscopic image according to claim 13, wherein the method for obtaining the first disparity correction amount and the second disparity correction amount is performed through calculation with triangulation.

* * * * *